United States Patent [19]

Bloch

[11] 3,907,856
[45] Sept. 23, 1975

[54] BIODEGRADABLE SULFATE DETERGENTS
[75] Inventor: Herman S. Bloch, Skokie, Ill.
[73] Assignee: Universal Oil Products Company, Des Plaines, Ill.
[22] Filed: Nov. 4, 1974
[21] Appl. No.: 520,695

Related U.S. Application Data

[63] Continuation-in-part of Ser. No. 277,836, Aug. 3, 1972, Pat. No. 3,867,421.

[52] U.S. Cl. .......... 260/457; 260/617 R; 260/631 R; 252/545; 252/547
[51] Int. Cl.$^2$ .................................. C07C 141/12
[58] Field of Search..... 260/457, 458, 617 R, 631 R

[56] References Cited
UNITED STATES PATENTS

| | | | |
|---|---|---|---|
| 2,435,403 | 2/1948 | Morris et al. | 260/617 R |
| 2,863,925 | 12/1958 | Starchu | 260/617 R |
| 3,385,873 | 5/1968 | Caldwell | 260/457 |
| 3,392,185 | 7/1968 | Walts et al. | 260/457 |

*Primary Examiner*—Bernard Helfin
*Assistant Examiner*—Nicky Chan
*Attorney, Agent, or Firm*—James R. Hoatson, Jr.; Raymond H. Nelson; William H. Page, II

[57] ABSTRACT

Biodegradable sulfate detergents may be prepared by condensing butadiene with allyl alcohol to form a hydroxymethylcyclohexene, thereafter ring alkylating said compound with a 1-alkene in the presence of a free-radical generating compound and hydrogen chloride to form an n-alkyl-substituted hydroxymethylcyclohexene, sulfating and neutralizing the compound to form the desired product.

8 Claims, No Drawings

BIODEGRADABLE SULFATE DETERGENTS

CROSS-REFERENCE TO RELATED APPLICATIONS

This application is a continuation-in-part of my copending application Ser. No. 277,836 filed August 3, 1972, now U.S. Pat. No. 3,867,421, all the teachings of which are specifically incorporated herein by reference.

This invention relates to a process for preparing biodegradable detergents. More specifically, the invention is concerned with a novel process comprising a series of steps hereinafter set forth in greater detail whereby alkali metal, alkaline earth metal or ammonium salts of an n-substituted cyclohexenyl methano sulfate are formed, said compounds being biodegradable in nature.

One of the major problems which is prevalent in population centers throughout the world is the disposal of sewage containing detergents dissolved therein. Such disposal problems are especially trying in the case of branch-chained alkylaryl detergents. These detergents produce stable foams in hard or soft waters in such large quantities that the foam clogs sewage treatment facilities, and destroys the bacteria which are necessary for proper sewage treatment. In many rivers, streams, lakes, etc., which act as a water supply for the aforesaid population centers, there are found these unwanted foams and suds. As hereinbefore set forth, the presence of these unwanted foams or suds is due in many instances to the use of detergents which are non-biodegradable in nature and which will not break down by bacterial action thereon. The non-biodegradable nature of these detergents is due to the fact that the alkyl side chain of the molecule is in many instances highly branched and therefore not readily attacked by the organisms which would ordinarily destroy the molecule. In contradistinction to this, the use of straight chain alkyl substituents on the ring will permit the detergents to be destroyed and therefore foams or suds will not build up on the surface of the water.

It is therefore an object of this invention to provide a novel method for the production of detergents which show biodegradability in both urban and rural sewage disposal systems.

In one aspect an embodiment of this invention resides in a process for the preparation of a biodegradable detergent which comprises the steps of: (a) condensing butadiene with allyl alcohol in a Diels-Alder reaction at a temperature in the range of from about 50° to about 190° C. and a pressure of from atmospheric to about 100 atmospheres to form hydroxymethylcyclohexene; (b) ring alkylating said hydroxymethylcyclohexene with a 1-alkene in the presence of an organic peroxy free-radical generating compound and hydrogen chloride at a temperature at least as high as the decomposition temperature of said free-radical generating compound to form an n-alkyl-substituted hydroxymethylcyclohexene; (c) sulfating said n-alkyl-substituted hydroxymethylcyclohexene with a sulfating agent selected from the group consisting of sulfuric acid, oleum, sulfur trioxide, and chlorosulfonic acid at a temperature of from about 0° to about 60° C. to form the sulfate ester thereof; (d) neutralizing said ester with a neutralizing agent selected from the group consisting of alkali metal base, alkaline earth metal base, ammonia, ammonium hydroxide, lower alkyl- and alkanol amine and benzyl amine to form the resultant biodegradable detergent, and (e) recovering the same.

A specific embodiment of this invention is found in a process for the preparation of a biodegradable detergent which comprises the steps of condensing butadiene with allyl alcohol at a temperature in the range of from about 50° to about 190° C. and a pressure in the range of from about atmospheric to about 100 atmospheres, ring alkylating the resultant hydroxymethylcyclohexene with 1-octene in the presence of di-t-butyl peroxide and hydrogen chloride at a temperature at least as high as the decomposition temperature of said di-t-butyl peroxide, sulfating the resultant n-octyl hydroxymethylcyclohexene with sulfuric acid at a temperature in the range of from about 0° to about 60° C., neutralizing the sulfate ester with sodium hydroxide at a temperature in the range of from about ambient to about 40° C. and recovering the resultant sodium(n-octyl-3-cyclohexenyl)methano sulfate.

Other objects and embodiments will be found in the following further detailed description of the present invention.

As hereinbefore set forth, the present invention is concerned with a process for the preparation of detergents which are biodegradable in nature, the process being effected in a series of steps. In the first step of the reaction, butadiene is condensed with allyl alcohol in a Diels-Alder type condensation to give 4-hydroxymethylcyclohexene. The Diels-Alder condensation is effected at elevated temperatures, usually in the range of from about 50° to about 190° C. and at a pressure ranging from atmospheric to about 100 atmospheres. The reaction pressure may be afforded by the autogenous pressure of the butadiene or by a combination of butadiene and a substantially inert gas such as nitrogen or argon, the amount of pressure which is utilized being that which is sufficient to maintain at least a portion of the reactants in the liquid phase.

The 4-hydroxymethylcyclohexene which has been prepared according to the above paragraph is recovered and selectively alkylated utilizing an olefinic hydrocarbon as the alkylating agent. The selective alkylation in which the alkyl substituent is positioned on the ring rather than on the side chain is effected by treating the reactants in the presence of a free-radical generating compound and hydrogen chloride. In the preferred embodiment of the invention, the olefinic hydrocarbon which is utilized as the alkylating agent will comprise a 1-alkene containing from 3 to about 20 carbon atoms in length and preferably from about 4 to about 14 carbon atoms. By utilizing the 1-alkene and an alkylation catalyst comprising a free-radical generating compound and a promotor comprising hydrogen chloride, it is possible to obtain a normal alkyl side chain on the cyclohexene ring rather than a secondary alkyl side chain which would result if the alkylation were effected in the presence of an acidic catalyst of the Friedel-Crafts type or sulfuric acid, etc. Specific examples of the alpha-olefinic hydrocarbons which are utilized as alkylating agents include propene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, etc.

The catalysts which are used in this step of the invention will include peroxy compounds, containing the bivalent radical —O—O—, which decompose to form free radicals which initiate the general reaction and are capable of inducing the condensation of the hydroxymethylcyclohexene with the 1-alkene. Examples of these catalysts include the persulfates, perborates, percarbonates of ammonium and of the alkali metals, or organic peroxy compounds. The organic peroxy compounds constitute a preferred class of catalysts for use in the invention and include peracetic acid, persuccinic acid, methyl ethyl ketone peroxide, methyl isobutyl ketone peroxide, acetyl peroxide, dipropionyl peroxide, di-t-butyl peroxide, butyryl peroxide, lauroyl peroxide, benzoyl peroxide, tetralin peroxide, urea peroxide, t-butyl perbenzoate, t-butyl hydroperoxide, methylcyclohexyl hydroperoxide, cumene hydroperoxide, diisopropylbenzene hydroperoxide, etc. Mixtures of peroxy compound catalysts may be employed or the peroxy compound catalyst may be utilized in admixture with various diluents. Thus, organic peroxy compounds which are compounded commercially with various diluents which may be used include benzoyl peroxide compounded with calcium sulfate, benzoyl peroxide compounded with camphor, phthalate esters, etc. Only catalytic amounts (less than stoichiometric amounts) need be used in the process.

The alkylation of the hydroxymethylcyclohexene with the 1-alkene is effected at elevated reaction temperatures which should be at least as high as the initial decomposition temperature of the free-radical generating catalyst, such as the peroxide compound, in order to liberate and form free radicals which promote the reaction. In selecting a particular reaction temperature for use in the process of the present invention, two considerations must be taken into account. First sufficient energy by means of heat must be supplied to the reaction so that the reactants, namely, the hydroxymethylcyclohexene and the 1-alkenes, will be activated sufficiently for condensation to take place when free radicals are generated by the catalyst. Second, free-radical generating catalysts such as peroxy compounds, particularly organic peroxides, decompose at a measurable rate with time in a logarithmic function dependent upon temperature. This rate of decomposition can be and ordinarily is expressed as the half life of a peroxide at a particular temperature. For example, the half life in hours for di-t-butyl peroxide is 11 hours at 125° C., 4 hours at 135° C., and 1.5 hours at 145° C. A reaction system temperature must then be selected so that the free-radical generating catalyst decomposes smoothly with the generation of free radicals at a half life which is not too long. In other words, sufficient free radicals must be present to induce the desired chain reaction to take place, and these radicals must be formed at a temperature at which the reactants are in a suitably activated state for condensation. When the half life of the free-radical generating catalyst is greater than 10 hours, radicals are not generated at a sufficient rate to cause the reaction of the process of the present invention to go forward at a practically useful rate. Thus the reaction temperature may be within the range of from about 50° to about 300° C. and at least as high as the decomposition temperature of the catalyst, by which is meant a temperature such that the half life of the free-radical generating catalyst is not greater than 10 hours. Since the half life for each free-radical generating catalyst is different at different temperatures, the exact temperature to be utilized in a particular reaction will vary. However, persons skilled in the art are well acquainted with the half life vs. temperature data for different free-radical generating catalysts. Thus it is within the skill of one familiar with the art to select the particular temperature needed for any particular catalyst. However, the operating temperatures generally do not exceed the decomposition temperature of the catalyst by more than about 100° C. since free-radical generating catalysts decompose rapidly under such conditions. For example, when a free-radical generating catalyst such as t-butyl perbenzoate is used, having a 50% decomposition temperature (in 10 hours) of approximately 105° C., the operating temperature of the process is from about 105° C. to about 205° C. When di-t-butyl peroxide having a 10 hour, 50% decomposition temperature of about 125° C. is used, the process is run at a temperature ranging from about 125° to about 225° C. Higher reaction temperatures may be employed, but little advantage is gained if the temperature is more than the hereinbefore mentioned 100° C. higher than the 10 hour, 50% decomposition temperature of the catalyst. The general effect of increasing the operating temperature is to accelerate the rate of condensation reaction of the hydroxymethylcyclohexene with the 1-alkene. However, the increased rate of reaction is accompanied by certain amounts of decomposition. In addition to the elevated temperatures which are utilized, the reaction may also be effected at elevated pressures ranging from 1 to about 100 atmospheres or more, the preferred operating pressure of the process being that which is required to maintain a substantial portion of the reactants in liquid phase. Pressure is not an important variable in the process of this invention. However, because of the low boiling points of some of the reactants, it is necessary to utilize pressure-withstanding equipment to insure liquid phase conditions. In batch type operations, it is often desirable to utilize pressure-withstanding equipment to charge the reactants and the catalyst to the vessel and to pressure the vessel with 10 or 30 or 50 or more atmospheres of an inert gas such as nitrogen. This helps to insure the presence of liquid phase conditions. However, when the mole quantity of reactants is sufficient, the pressure which they themselves generate at the temperature utilized is sufficient to maintain the desired phase conditions.

Furthermore, the concentration of the catalyst employed in this process may vary over a rather wide range but it is desirable to utilize low concentrations of catalysts such as from about 0.1% to about 10% of the total weight of the combined starting materials charged to the process. The reaction time may be within the range of from less than one minute to several hours, depending upon temperature and half life of the catalyst. Generally speaking, contact times of at least 10 minutes are preferred.

In addition to the free-radical generating catalyst, the alkylation is also effected in the presence of a hydrogen chloride compound. The hydrogen chloride compound is used as a promoter for the reaction and also is used to prevent or inhibit telomerization, said telomerization being a polymerization reaction in which unwanted side reaction products may be formed. The hydrogen chloride may be present as anhydrous hydrogen chloride, as concentrated hydrochloric acid or as a more dilute aqueous solution of hydrochloric acid, the hydrochloric acid being present in an amount of from 5% to about 38% in said aqueous solution.

The resulting compound comprising n-alkyl-substituted hydroxymethylcyclohexenes is then subjected to the sulfating step in which the sulfate ester of the methylcyclohexene is prepared. This sulfating step is accomplished by treating the alkyl-substituted hydroxymethylcyclohexene with a conventional sulfating agent such as sulfuric acid, oleum, sulfur trioxide, chlorosulfonic acid, etc., at temperatures ranging from about 0° to about 60° C., the particular temperature which is to be employed being dependent upon the type of sulfating agent which is used. For example, when the sulfating agent comprises sulfur trioxide or oleum, the reaction may be effected at a temperature in the subambient range, that is, from about 0° up to about 25° C. When employing other sulfating agents such as sulfuric acid, the reaction may be effected over the entire range hereinbefore set forth, that is, from about 0° up to about 60° C. Likewise the use of chlorosulfonic acid as the sulfating agent will permit the reaction to be effected at ambient (about 20° to 25° C.) temperatures.

The sulfate ester which is thus prepared is then neutralized by utilizing a conventional neutralizing agent such as an alkali metal base, an alkaline earth base, ammonia or an amine. Specific examples of these neutralizing agents will include sodium hydroxide, potassium hydroxide, lithium hydroxide, rubidium hydroxide, cesium hydroxide, magnesium hydroxide, calcium hydroxide, strontium hydroxide, ammonia, ammonium hydroxide, amines such as ethanol amine, propanol amine, benzyl amine, N,N-dimethylbenzyl amine, N,N-diethylbenzyl amine, dimethyl amine, diethyl amine, dipropyl amine, etc. The preferred neutralizing agents comprise ammonium hydroxide, sodium hydroxide or potassium hydroxide due to the greater availability and relatively lower cost of these compounds. The neutralization reaction, being exothermic in nature, is usually run under a controlled temperature system, the preferred temperature for the reaction being from about ambient up to about 40° C. The control of the temperature is usually effected by utilizing cooling means including ice, cooling coils, etc., whereby the alkali metal, alkaline earth metal or ammonium salt of the sulfate is obtained.

The process of this invention in which biodegradable sulfate detergents are prepared may be effected in either a batch or continuous operation. When a batch type operation is used, a quantity of the allyl alcohol is placed in an appropriate apparatus such as an autoclave of the rotating or mixing type. The autoclave is sealed and the butadiene is charged thereto or in an alternate method, a mixture of butadiene and an inert gas such as nitrogen is charged thereto, until the desired operating pressure is reached. The autoclave is thereafter heated to the desired operating temperature within the range hereinbefore set forth and maintained thereat for a predetermined residence time which may range from 0.5 up to about 10 hours or more in duration. Upon completion of the desired residence time, heating is discontinued, the autoclave is allowed to return to room temperature, the excess pressure is vented and the reaction mixture is recovered therefrom. The hydroxymethylcyclohexene is separated from any unreacted allyl alcohol by conventional means such as distillation or by any other separation means known in the art and placed in a second reaction vessel along with a free-radical generating compound and the 1-alkene which is to be utilized as the alkylating agent. This second reaction vessel may be a flask provided with condensing means or an autoclave of the rotating or mixing type. In addition, a promoter comprising hydrogen chloride either in gaseous form as hydrogen chloride or in aqueous form as hydrochloric acid is added to the reactor which is thereafter heated to the desired operating temperature which, as hereinbefore set forth, is at least as high as the decomposition temperature of said free-radical generating compound. After maintaining the alkylation reaction at this temperature for a predetermined period of time which may range from about 0.5 up to about 10 hours, heating is discontinued, the reaction mixture is allowed to return to room temperature and the n-alkyl-substituted hydroxymethylcyclohexene is separated and recovered by conventional means.

The n-alkyl hydroxymethylcyclohexene is then treated with a sulfating agent to form the sulfate ester thereof. This treatment is accomplished by placing the cyclohexene in an appropriate apparatus and adding thereto the sulfating agent. This apparatus may comprise a reaction flask if the sulfating agent is in liquid form or a pressure vessel if sulfur trioxide is utilized as the sulfating agent. The sulfating reaction is effected at a temperature ranging from about 0° to about 60° C., the reactor being cooled or heated according to the particular sulfating agent which is employed, said cooling or heating means which will be employed being of the conventional type such as cooling coils, ice, etc., or heating coils, etc., if elevated temperatures are employed.

The resultant sulfate ester may be separated from unreacted starting material after recovery from the reaction vessel, but the reaction is preferably carried virtually to completion so that the product may then be neutralized by treatment with a compound of the type hereinbefore set forth. To accomplish this, the sulfate ester may be introduced into an appropriate apparatus also provided with cooling means in order to control the temperature of the reaction which is exothermic in nature. The neutralizing agent such as the alkali metal base, alkaline earth metal base, ammonia or amine is usually present in the reactor in a slight molar excess over the sulfate ester and the latter is gradually added with adequate mixing of the reactants. The reaction is allowed to proceed while controlling the temperature, said residence time also being in a range of from 0.5 up to about 10 hours or more in duration. Upon completion of the desired residence time, the reaction mixture is recovered and subjected to conventional means of separation which include washing, drying, extraction, etc., whereby the desired alkali metal, alkaline earth metal or ammonia salts of the n-alkyl-substituted cyclohexenemethano sulfates are recovered.

It is also contemplated within the scope of this invention that the desired product may be prepared while employing a continuous manner of operation. When the continuous manner of operation is to be used, the starting materials comprising the allyl alcohol and butadiene are continuously charged to a reactor which is maintained at the proper operating conditions of temperature and pressure. After passage through this reactor for a predetermined period of time, the effluent is continuously withdrawn and subjected to a separation step whereby the unreacted allyl alcohol and butadiene are separated from the hydroxymethylcyclohexene and recycled to form a portion of the feed stock while the latter is continuously charged to an alkylation apparatus which is also maintained at the proper operating conditions of temperature and pressure. In addition, the 1-alkene, the free-radical generating compound and the hydrogen chloride promoter are also continuously charged to the apparatus through separate lines or, if so desired, one or more of the reactants may be admixed with another prior to entry into said reactor and the resulting mixture charged thereto in a single stream. After completion of the desired residence time in the alkylation apparatus, the reactor effluent is continuously withdrawn, again subjected to separation steps whereby unreacted starting materials, promoter and by-products are separated from the alkyl-substituted hydroxymethylcyclohexene. The unreacted starting materials are recycled to the apparatus to form a portion of the feed stock while the n-alkyl-substituted hydroxymethylcyclohexene is continuously charged to the sulfating reactor. In this reactor the aforementioned cyclohexene is subjected to the action of a sulfating agent which is also continuously charged to this reactor, said reactor being maintained at the proper operating conditions, especially temperature. After passage through this reactor for a predetermined period of time, the effluent is continuously withdrawn, again subjected to separation steps, if necessary, whereby the unreacted substituted cyclohexene and sulfating agent are separated from the sulfate ester and recycled to form a portion of the feed stock in this reactor, the sulfate ester being continuously charged to the neutralization zone. In this zone, the sulfate ester is subjected to the action of the neutralizing agent which is also continuously charged thereto. Inasmuch as the reaction is exothermic in nature, as hereinbefore set forth, the temperature of the last named reactor is carefully maintained in a range of from about 0° C. up to about 40° C. in order that any unwanted side reactions are minimized and a higher yield of the desired product is obtained thereby. As in the prior steps in this continuous type of operation, the reactor effluent is also continuously withdrawn and the final product is separated and recovered while any unreacted starting materials are recycled to the neutralization zone to form a portion of the feed stock thereto.

The following examples are given to illustrate the process of the present invention which, however, are not intended to limit the generally broad scope of the present invention in strict accordance therewith.

EXAMPLE I

In this example 58 grams (1.0 mole) of allyl alcohol are placed in the glass liner of a rotating autoclave. The liner is sealed into the autoclave and 54 grams (1.0 mole) of butadiene are charged thereto. Following this, the autoclave is then heated to a temperature of 125° C. and maintained thereat for a period of 4 hours. At the end of this time, heating is discontinued, and the autoclave is allowed to return to room temperature. The autoclave is thereafter opened and the reaction mixture is recovered therefrom. Following this, the mixture is subjected to fractional distillation whereby the desired product comprising 4-hydroxymethylcyclohexene is separated from any unreacted allyl alcohol and recovered.

The 4-hydroxymethylcyclohexene which is recovered is then placed in the glass liner of a rotating autoclave along with 1-octene, the charge stock usually consisting of a molar excess of the hydroxymethylcyclohexene over the 1-octene in a range of from about 1.5:1 to about 2:1 moles of hydroxymethylcyclohexene per mole of 1-octene. In addition, 7 grams of di-t-butyl peroxide and 20 grams of concentrated hydrochloric acid are also placed in the autoclave. The autoclave is sealed and nitrogen is pressed in until an initial operating pressure of 30 atmospheres is reached. The autoclave and contents thereof are then heated to a temperature of 130° C. and maintained in a range of from about 130° to about 140° C. for a period of 8 hours. At the end of this 8-hour period, heating is discontinued, the autoclave is allowed to return to room temperature and the excess pressure is discharged therefrom. The autoclave is then opened, the reaction mixture is recovered and subjected to fractional distillation, usually under reduced pressure, whereby the desired product comprising the n-octyl-substituted 4-hydroxymethylcyclohexene is recovered. The n-octyl-substituted hydroxymethylcyclohexene is then placed in a reaction vessel and a slight excess of sulfuric acid is added thereto. The reaction apparatus is warmed to a temperature of 30° C. and maintained thereat for a period of about 4 hours. At the end of this time, heating is discontinued and the reactor is allowed to return to room temperature. The resulting sulfate ester is then placed in another reaction vessel provided with cooling means and an aqueous solution of sodium hydroxide in a slight excess is slowly added to the sulfate ester, the temperature of the reaction being maintained at about 25° C. by means of cooling coils. At the end of a 2-hour period, the reaction mixture is dried and the desired product comprising sodium(n-octyl-3-cyclohexenyl)methano sulfate is recovered.

EXAMPLE II

In this example 1 mole proportion of allyl alcohol is placed in the glass liner of a rotating autoclave which is thereafter sealed into the autoclave. A mole proportion of butadiene along with a sufficient amount of nitrogen is pressed into the autoclave until an initial operating pressure of 30 atmospheres is reached. The autoclave and contents thereof are then heated to a temperature of 140° C. and maintained in a range of from 135° to 140° C. for a period of 4 hours. At the end of the 4-hour period, heating is discontinued, the autoclave is allowed to return to room temperature and the excess pressure is discharged therefrom. The autoclave is opened and the reaction mixture is recovered and subjected to fractional distillation under reduced pressure whereby the desired product comprising 4-hydroxymethylcyclohexene is separated and recovered.

The hydroxymethylcyclohexene which is prepared according to the above paragraph is then placed in another liner of a rotating autoclave along with 1-tetradecene, the hydroxymethylcyclohexene being present in a molar excess over the tetradecene. In addition, a catalyst comprising 7 grams of di-t-butyl peroxide and a promoter comprising 20 grams of hydrochloric acid are also added to the liner. The liner is then sealed into the autoclave and nitrogen is pressed in until an initial operating pressure of 30 atmospheres is reached. The autoclave and contents thereof are then heated to a temperature of 130° C. and maintained in a range of from 130° to 140° C. for a period of 8 hours. At the end of the 8-hour period, heating is discontinued, the autoclave is allowed to return to room temperature, the excess pressure is discharged and the autoclave is opened. After subjecting the reaction mixture to fractional distillation under reduced pressure, the desired n-tetradecyl-substituted 4-hydroxymethylcyclohexene is recovered.

As in Example I, the disubstituted cyclohexene is sulfated in a similar manner with sulfuric acid and neutralized with an aqueous solution of sodium hydroxide whereby the desired product comprising sodium(n-tetradecyl-3-cyclohexenyl)methano sulfate is recovered.

EXAMPLE III

In this example 4-hydroxymethylcyclohexene is prepared in a manner similar to that hereinbefore set forth. The thus prepared hydroxymethylcyclohexene is alkylated by reaction with 1-decene in a similar manner to that set forth in the above examples, that is, by treating a molar excess of the hydroxymethylcyclohexene with 1-decene in the presence of a catalyst comprising di-t-butyl peroxide and a promoter comprising hydrochloric acid at a temperature of about 130° C. for a period of 8 hours under an initial operating pressure of 30 atmospheres of nitrogen.

After recovery of the n-decyl-substituted 4-hydroxymethylcyclohexene by conventional means of separation, the compound is then placed in another reaction apparatus for preparation of the sulfate ester. In this step liquid sulfur trioxide is vaporized and admixed with air so that the stream which is introduced into the reactor will contain approximately 7 volume % of sulfur trioxide. This stream is charged to the reactor at a temperature of about 10° C. (maintained by cooling coils) in a sufficient amount so that there is a slight excess of sulfur trioxide present, said amount being in a range of from about 1.01 up to about 1.1 moles of sulfur trioxide per mole of decyl-substituted hydroxymethylcyclohexene. Upon completion of the addition of the sulfur trioxide, the resulting mixture is passed to an aging tank and allowed to age for a period of about 15 minutes at ambient temperature to insure complete reaction. The sulfate ester is then placed in another reaction apparatus which contains cooling means for regulating the temperature of the reaction. An aqueous solution of potassium hydroxide is slowly added to the sulfate ester during a period of about 30 minutes while maintaining the temperature in a range of from about 20° to about 25° C., said potassium hydroxide being in a slight molar excess over the sulfate ester. At the end of the addition, the mixture is thoroughly stirred for a period of 1 hour and thereafter subjected to conventional means of drying and separation whereby the desired biodegradable detergent comprising potassium(n-decyl-3-cyclohexenyl)methano sulfate is recovered.

EXAMPLE IV

In a manner similar to that set forth in the above examples, 1 mole proportion of allyl alcohol is placed in the glass liner of a rotating autoclave which is thereafter sealed into the autoclave and a mole proportion of butadiene along with a sufficient amount of nitrogen is pressed into the autoclave until an initial operating pressure of 30 atmospheres is reached. Following this, the autoclave and contents thereof are then heated to a temperature of 140° C. and maintained thereat for a period of 4 hours, at the end of which time heating is discontinued, the autoclave is allowed to return to room temperature and the excess pressure is discharged therefrom. The autoclave is opened and the reaction mixture is treated in a conventional manner to separate and recover the desired 4-hydroxymethylcyclohexene.

The thus prepared 4-hydroxymethylcyclohexene is placed in another liner of a rotating autoclave along with 1-dodecene, the hydroxymethylcyclohexene being present in a molar excess over the dodecene. In addition, a catalyst comprising 7 grams of benzoyl peroxide and a promoter comprising 20 grams of hydrochloric acid are also added to the liner. The liner is then sealed into the autoclave and nitrogen is pressed in until an initial operating pressure of 30 atmospheres is reached. The autoclave and contents thereof are then heated to a temperature of 80° C. and maintained in a range of from 85° to 90° C. for a period of 8 hours. At the end of the 8-hour period, heating is discontinued, the autoclave is allowed to return to room temperature, the excess pressure is discharged and the autoclave is opened. The reaction mixture is recovered therefrom and subjected to fractional distillation under reduced pressure whereby the desired n-dodecyl-substituted hydroxymethylcyclohexene is recovered.

The n-dodecyl-substituted hydroxymethylcyclohexene is then placed in a reaction vessel and a slight excess of oleum is added thereto. After warming the reaction apparatus to a temperature of about 30° C. and maintaining said apparatus thereat for a period of 4 hours, the heating is discontinued and the reactor is allowed to return to room temperature. The thus prepared sulfate ester is placed in another reactor which is provided with external cooling means and an aqueous solution of ammonium hydroxide in a slight excess is slowly added to the sulfate ester, the temperature of the reaction being maintained at about 20° C. At the end of the slow addition, the reaction mixture is stirred for an additional period of 1 hour and the desired product comprising ammonium(n-dodecyl-3-cyclohexenyl)methano sulfate is recovered therefrom.

EXAMPLE V

In like manner 4-hydroxymethylcyclohexene is prepared by reacting equimolar proportions of allyl alcohol and butadiene in an autoclave under an applied pressure of 30 atmospheres of nitrogen and at a temperature of 130° C. for a period of 4 hours.

The hydroxymethylcyclohexene is recovered and reacted with 1-tridecene in the presence of a catalyst comprising di-t-butyl peroxide and a promoter comprising hydrogen chloride, this reaction being effected in an autoclave at a temperature in the range of from 130° to 140° C. and a pressure of 30 atmospheres for a period of 8 hours.

The resulting n-tridecyl hydroxymethylcyclohexene which is prepared according to the above paragraph is then sulfated by treatment with chlorosulfonic acid in a manner similar to that set forth in the above examples and neutralized by treatment with an aqueous solution of potassium hydroxide whereby the desired product comprising potassium(n-tridecyl-3-cyclohexenyl)methano sulfate is recovered.

I claim as my invention:

1. A process for the preparation of a biodegradable detergent which comprises the steps of:
   a. condensing butadiene with allyl alcohol in a Diels-Alder reaction at a temperature in the range of from about 50° to about 190° C. and a pressure of from atmospheric to about 100 atmospheres to form hydroxymethylcyclohexene;
   b. ring alkylating said hydroxymethylcyclohexene with a 1-alkene in the presence of an organic peroxy free-radical generating compound and hydrogen chloride at a temperature at least as high as the decomposition temperature of said free-radical generating compound to form an n-alkyl-substituted hydroxymethylcyclohexene;
   c. sulfating said n-alkyl-substituted hydroxymethylcyclohexene with a sulfating agent selected from the group consisting of sulfuric acid, oleum, sulfur trioxide, and chlorosulfonic acid at a temperature of from about 0° to about 60° C. to form the sulfate ester thereof;
   d. neutralizing said ester with a neutralizing agent selected from the group consisting of alkali metal base, alkaline earth metal base, ammonia, ammonium hydroxide, lower alkyl- and alkanol amine and benzyl amine to form the resultant biodegradable detergent; and
   e. recovering the same.

2. The process as set forth in claim 1 in which said sulfating agent is present in an amount of from about 1.01 to about 1.1 moles of sulfating agent per mole of n-alkyl-substituted hydroxymethylcyclohexene.

3. The process as set forth in claim 1 in which said 1-alkene contains from 3 to about 20 carbon atoms.

4. The process as set forth in claim 1 in which said alkene is 1-octene, said sulfating agent is sulfuric acid, said neutralizing agent is sodium hydroxide and said biodegradable detergent is sodium(n-octyl-3-cyclohexenyl)methano sulfate.

5. The process as set forth in claim 1 in which said alkene is 1-decene, said sulfating agent is sulfur trioxide, said neutralizing agent is potassium hydroxide and said biodegradable detergent is potassium(n-decyl-3-cyclohexenyl)methano sulfate.

6. The process as set forth in claim 1 in which said alkene is 1-dodecene, said sulfating agent is oleum, said neutralizing agent is ammonium hydroxide and said biodegradable detergent is ammonium(n-dodecyl-3-cyclohexenyl)methano sulfate.

7. The process as set forth in claim 1 in which said alkene is 1-tridecene, said sulfating agent is chlorosulfonic acid, said neutralizing agent is potassium hydroxide and said biodegradable detergent is potassium(n-tridecyl-3-cyclohexenyl)methano sulfate.

8. The process as set forth in claim 1 in which said alkene is 1-tetradecene, said sulfating agent is sulfuric acid, said neutralizing agent is sodium hydroxide and said biodegradable detergent is sodium(n-tetradecyl-3-cyclohexenyl)methano sulfate.

* * * * *